United States Patent
Park et al.

(10) Patent No.: US 9,638,928 B2
(45) Date of Patent: May 2, 2017

(54) ACTIVE DIFFUSER FOR REDUCING SPECKLE AND LASER DISPLAY DEVICE HAVING ACTIVE DIFFUSER

(71) Applicant: Electronics and Telecommunications Research Institute, Daejeon (KR)

(72) Inventors: Sun-Tak Park, Daejeon (KR); Bong-Je Park, Daejeon (KR); Ki-Uk Kyung, Seoul (KR); Sung-Ryul Yun, Daejeon (KR); Sae-Kwang Nam, Daegu (KR)

(73) Assignee: ELECTRONICS AND TELECOMMUNICATIONS RESEARCH INSTITUE, Daejeon (KR)

( * ) Notice: Subject to any disclaimer, the term of this patent is extended or adjusted under 35 U.S.C. 154(b) by 22 days.

(21) Appl. No.: 14/168,476

(22) Filed: Jan. 30, 2014

(65) Prior Publication Data
US 2015/0043079 A1    Feb. 12, 2015

(30) Foreign Application Priority Data
Aug. 8, 2013  (KR) .................. 10-2013-0094000

(51) Int. Cl.
*G02B 27/48*     (2006.01)
*G02B 5/02*      (2006.01)
(Continued)

(52) U.S. Cl.
CPC ............ *G02B 27/48* (2013.01); *G02B 5/021* (2013.01); *G02B 26/06* (2013.01); *G02B 3/0006* (2013.01); *G02B 5/0278* (2013.01); *G02F 1/0128* (2013.01)

(58) Field of Classification Search
CPC ........ G02B 27/48; G02B 5/021; G02B 26/06; G02B 5/02; G02B 5/0205; G02B 5/0221;
(Continued)

(56) References Cited

U.S. PATENT DOCUMENTS 6,122,023 A *  9/2000  Chen et al. ................... 349/86
8,240,855 B2    8/2012  Prudnikov
(Continued)

FOREIGN PATENT DOCUMENTS

JP          11-218726 A      8/1999
KR       10-0858084 B1      9/2008
(Continued)

OTHER PUBLICATIONS

Ginger et al. "Laser Speckle Reduction based on electroactive polymers," The 1st Advanced Lasers and Photon Sources (ALPS'12), Yokohama, Japan, Apr. 26-Apr. 27, 2012.*

*Primary Examiner* — Zachary Wilkes
*Assistant Examiner* — George G King
(74) *Attorney, Agent, or Firm* — Rabin & Berdo, P.C.

(57) ABSTRACT

An active diffuser for reducing a speckle in accordance with an embodiment of the present invention includes: an electroactive polymer film having at least one or more scattering patterns; a first transparent electrode coated on one surface of the electroactive polymer film; and a second transparent electrode coated on the other surface of the electroactive polymer film, and a shape of the scattering pattern of the electroactive polymer film is varied by voltage applied through the first transparent electrode and the second transparent electrode.

11 Claims, 6 Drawing Sheets

(51) Int. Cl.
*G02B 26/06* (2006.01)
*G02F 1/01* (2006.01)
*G02B 3/00* (2006.01)

(58) Field of Classification Search
CPC .. G02B 5/0263; G02B 5/0273; G02B 5/0294; G02B 3/0006; G02B 3/0037; G02B 3/0043; G02B 3/0056; G02B 3/0075; G02B 2003/0093; G02B 26/00–26/0808; G02B 26/0875–26/0891; G02F 1/0128
See application file for complete search history.

(56) References Cited

U.S. PATENT DOCUMENTS

| | | | |
|---|---|---|---|
| 2004/0008399 A1* | 1/2004 | Trisnadi | 359/279 |
| 2008/0055698 A1 | 3/2008 | Yurlov et al. | |
| 2008/0192327 A1* | 8/2008 | Abu-Ageel | G02B 27/48 |
| | | | 359/237 |
| 2009/0033814 A1* | 2/2009 | Khan | 349/35 |
| 2011/0267680 A1* | 11/2011 | Aschwanden | 359/315 |
| 2012/0206782 A1* | 8/2012 | Chan | G02B 26/0833 |
| | | | 359/199.2 |

FOREIGN PATENT DOCUMENTS

| | | |
|---|---|---|
| KR | 10-2009-0012276 A | 2/2009 |
| KR | 10-1234037 B1 | 2/2013 |

\* cited by examiner

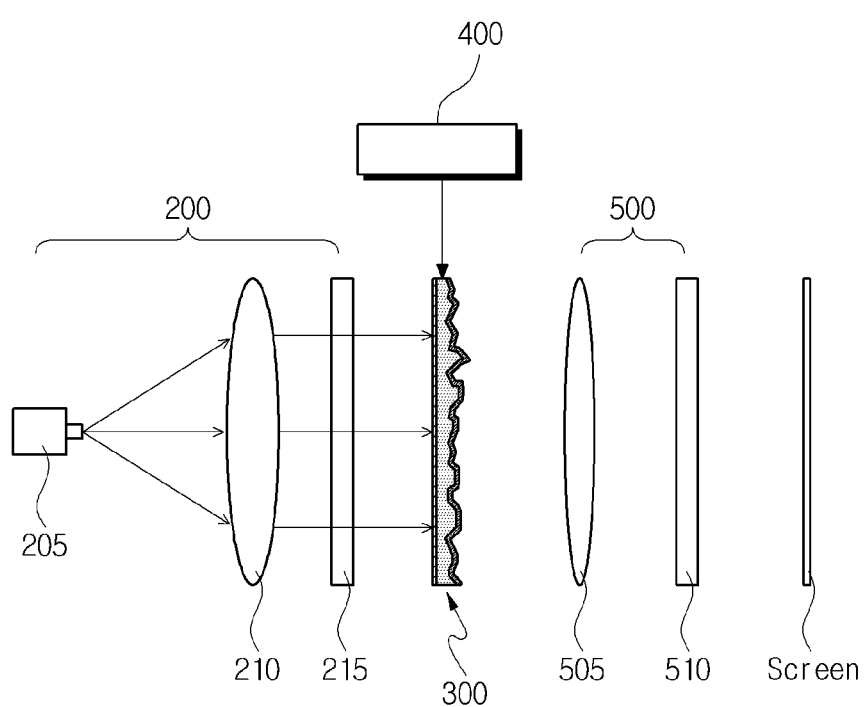

ACTIVE DIFFUSER FOR REDUCING SPECKLE AND LASER DISPLAY DEVICE HAVING ACTIVE DIFFUSER

CROSS-REFERENCE TO RELATED APPLICATIONS

This application claims the benefit of Korean Patent Application No. 10-2013-0094000, filed with the Korean Intellectual Property Office on Aug. 8, 2013, the disclosure of which is incorporated herein by reference in its entirety.

BACKGROUND

1. Technical Field

The present invention relates to reducing speckle noise generated in a laser display device, more specifically to a diffuser that reduces the speckle noise by actively changing the shape of scattering pattern of the diffuser having various shapes of scattering pattern and a laser display device having the diffuser.

2. Background Art

With the rapid growth in display technologies, display devices using laser as light source have been developed. The laser light source has better intensity and luminance than other light sources and thus can provide a clear image with a high contrast and can be realized in a small device. However, due to the high coherence, the laser light source generates speckles, which become a problem in the display. A speckle, which is a spot pattern that is generated by peculiar wave properties of an incident laser ray according to the surface roughness of a screen, deteriorates the screen quality significantly. Accordingly, there have been a variety of methods to reduce the speckle.

In one of the conventional technologies, a diffuser is provided to the display device and is made to move in order to reduce the speckle. Specifically, a laser ray is penetrated to the diffuser that is rotating or vibrating. As the diffuser rotates, the degree of penetrated and diffused laser ray is made irregular, or the phase of the laser ray is made irregular. Accordingly, the coherence, which is the peculiar characteristic of a laser ray, is reduced.

In another method, a wave front modulator is provided to a display device to reduce the speckle. By penetrating the laser ray through the wave front modulator, the phase of the laser ray is changed. The wave front having a phase spatial change generates multiple speckle patterns to reduce the speckle. In yet another method, the display screen is moved or vibrated.

However, since the above-described conventional methods use the rotation or vibration of the diffuser or screen to reduce the speckle, the display device or screen becomes to jiggle, causing displeasure to the viewers and making the display device unstable.

SUMMARY

The present invention provides an active diffuser that can vary the phase of a scattering pattern by fabricating a diffuser having the scatting pattern with electroactive polymer and applying voltage on both surfaces of the diffuser in order to reduce a laser speckle, as well as a laser display device using the active diffuser.

The active diffuser for reducing a speckle in accordance with an embodiment of the present invention includes: an electroactive polymer film having at least one or more scattering patterns; a first transparent electrode coated on one surface of the electroactive polymer film; and a second transparent electrode coated on the other surface of the electroactive polymer film, and a shape of the scattering pattern of the electroactive polymer film is varied by voltage applied through the first transparent electrode and the second transparent electrode.

The laser display device having an active diffuser in accordance with an embodiment of the present invention includes: a light input part including a laser light source, a lens configured for changing a laser ray outputted from the laser light source to a parallel ray, and a modulator configured for modulating an intensity of the laser ray outputted from the lens; an active diffuser configured for reducing a speckle of the laser ray by spatially and temporally changing a phase of the laser ray incident from the light input part according to applying of voltage; a voltage applying part connected with the active diffuser and configured for applying voltage to the active diffuser; and a light projecting part including a condensing lens configured for concentrating the laser ray outputted through the active diffuser and a scanner configured for projecting the laser ray outputted through the condensing lens to a screen.

With the present invention, the speckle generated due to the coherence of laser ray can be reduced without rotating or vibrating a diffuser or other optical parts. In other words, since the speckle can be reduced without the overall vibration or rotation of the diffuser in the display device using laser light source, the display device can be made smaller and have the alignment stability thereof improved. Moreover, by using an active diffuser having multi-level phases and a micro lens array pattern, the speckle can be further reduced through, for example, variation of focal distance.

BRIEF DESCRIPTION OF THE DRAWINGS

FIG. 6 illustrates a laser display device having the active diffuser in accordance with an embodiment of the present invention.

DETAILED DESCRIPTION

Hereinafter, an active diffuser for reducing a speckle in accordance with an embodiment of the present invention will be described in detail with reference to the accompanying drawings.

Figure 1:
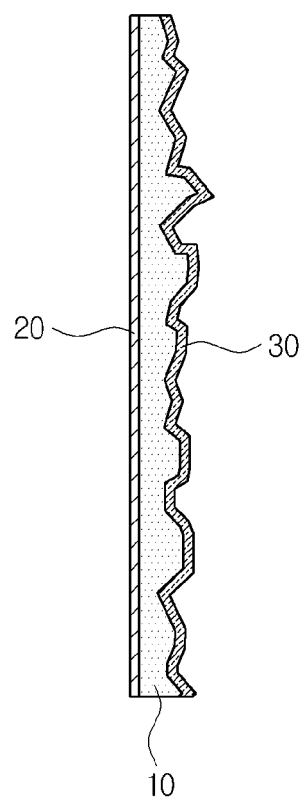
FIG. 1 shows an example of an active diffuser for reducing a speckle in accordance with an embodiment of the present invention.

FIG. 1 shows an example of an active diffuser for reducing a speckle in accordance with an embodiment of the present invention. The active diffuser for reducing a speckle in accordance with an embodiment of the present invention includes an electroactive polymer film 10, a first transparent electrode 20 and a second transparent electrode 30. The active diffuser for reducing a speckle in accordance with an embodiment of the present invention can change the phase of a scattering pattern by fabricating a diffuser having the scatting pattern with electroactive polymer and applying voltage on both surfaces of the diffuser in order to reduce a laser speckle.

The electroactive polymer film 10 has contracting and expanding properties when voltage is applied and has a scattering pattern that changes a shape thereof depending on whether voltage is applied or not. The phase of the scattering pattern of the electroactive polymer film 10 is changed by the voltage applied through the first transparent electrode 20 and the second transparent electrode 30, and the shape of the scattering pattern is changed due to the change in the phase of the scattering pattern. The shape of the scattering pattern of the electroactive polymer film 10 is periodically changed whenever the voltage is repeatedly applied to the electroactive polymer film 10 at regular intervals. Moreover, the change in the shape of the scattering pattern depends on the initial shape of the scattering pattern, the pattern shapes of the first transparent electrode 20 and the second transparent electrode 30 or the properties of the electroactive polymer film 10, as well as the supply of voltage.

The electroactive polymer film 10 has one or more scattering patterns. Particularly, the electroactive polymer film 10 has a plurality of scattering patterns formed with a multi-level phase, and each of the shapes of the plurality of scattering patterns is changed when voltage is applied.

Moreover, the scattering pattern of the electroactive polymer film 10 can be a micro lens pattern, in which lenses therein can have different sizes, and hence different phases, from one another. The micro lens pattern focuses or diffuses the laser ray, and changes the focal distance of the lens when voltage is applied.

The first transparent electrode 20 is coated on one surface of the electroactive polymer film 10. Moreover, the second transparent electrode 20 is coated on the other surface of the electroactive polymer film 10. While the first transparent electrode 20 and the second transparent electrode 30 are coated on either surface of the electroactive polymer film 10, they are connected to a voltage applying part (described later) to receive power provided by the voltage applying part and to form voltage at either end of the electroactive polymer film 10.

The first transparent electrode 20 and the second transparent electrode 30 are made of various electrode materials, such as ITO (Indium Tin Oxide), carbon nanotube, chalcogenide ($MoS_2$, $MoSe_2$, $WS_2$, etc.), grapheme, or silver nanowire. ITO, which is an electrically conductive transparent film, is made of a compound of indium and tin oxide (i.e., $In_2O_3$, $SnO_2$), mostly using a sputtering method. Carbon nanotube is a tube-shaped material that has a good electric conductivity and is a strong electrode element. Graphene has been getting the spotlight as a next generation, new material because it is very thin but is stable physically and chemically, very strong, very electrically conductive, and flexible. Silver nanowire is a transparent electrode that is highly electrically conductive and is made using porous alumina. Particularly, each of the first transparent electrode 20 and the second transparent electrode 30 is divided into a plurality of areas and has electrode pads formed therein to correspond to the plurality of areas.

Figure 2:
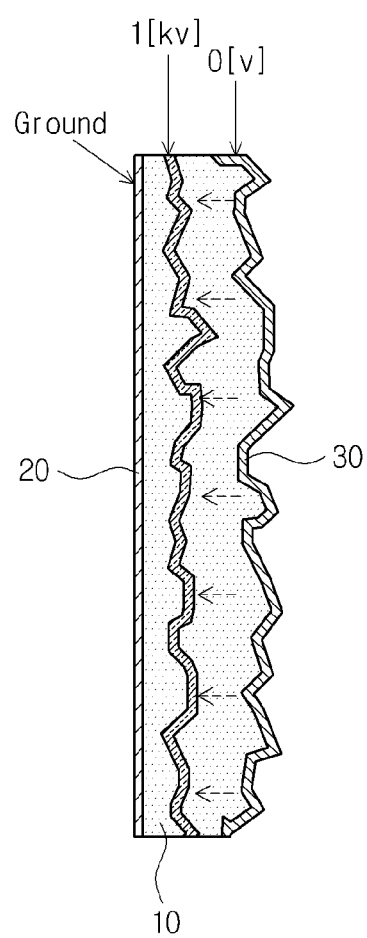
FIG. 2 illustrates how the active diffuser shown in FIG. 1 is operated when voltage is applied thereto.

FIG. 2 illustrates how the active diffuser shown in FIG. 1 is operated when voltage is applied thereto. As illustrated in FIG. 2, while the electroactive polymer film 10 has an initial shape (the shape when Voltage=0 [V]) having a certain scattering pattern when voltage is not applied to the electroactive polymer film 10 (i.e., Voltage=0 [V]), the initial shape is changed to a new scattering pattern (the shape when Voltage=1 [kV]) when voltage (e.g., Voltage=1 [kV]) is applied. The change in the shape of the scattering pattern depends on the voltage size, the initial shape of the scattering pattern, the pattern shapes of the first transparent electrode 20 and the second transparent electrode 30 or the properties of the electroactive polymer film 10. The shape of the scattering pattern of the electroactive polymer film 10 is periodically changed whenever the voltage is repeatedly applied at regular intervals, and the change in scattering pattern lowers the coherence of laser ray and reduces the speckle.

Figure 3:
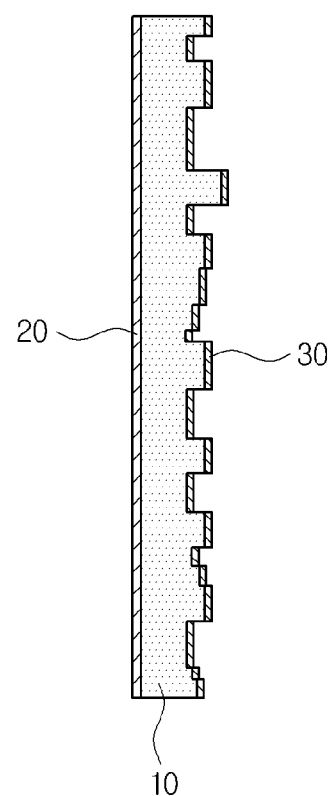
FIG. 3 shows an example of the active diffuser having a multi-level phase in accordance with an embodiment of the present invention.

FIG. 3 shows an example of the active diffuser having a multi-level phase in accordance with an embodiment of the present invention. The first transparent electrode 20 and the second transparent electrode 30 are coated on either surface of the electroactive polymer film 10, and the scattering pattern of the initial state of the diffuser when voltage is not applied is formed in a tiered shape so as to have multiple phases (i.e., multi-level phase). As each scattering pattern having its phase levels is changed to a scattering pattern having different levels due to the supply of voltage, this active diffuser having a multi-level phase can function as an active diffuser pursuant to multiple levels.

Figure 4:
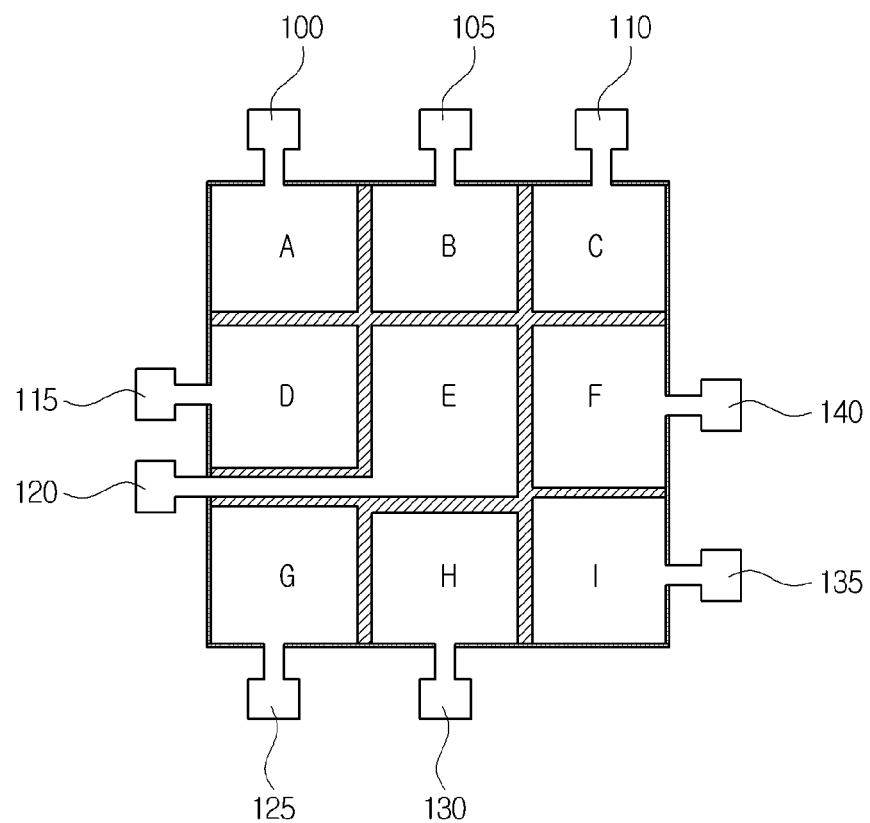
FIG. 4 shows the structure of a transparent electrode pattern of the active diffuser that can provide a different phase change for each area in accordance with an embodiment of the present invention.

Meanwhile, a uniform phase change can be made in all areas by applying a same voltage entirely to the electroactive polymer film 10, but it is possible to give different phase changes to the areas of the electroactive polymer film 10 by dividing the first transparent electrode 20 and the second transparent electrode 30 into predetermined areas and giving a different phase change for each divided area. FIG. 4 shows the structure of a transparent electrode pattern of the active diffuser that can provide a different phase change for each area in accordance with an embodiment of the present invention. As illustrated in FIG. 4, each of the first transparent electrode 20 and the second transparent electrode 30 is divided into a plurality of areas, that is, areas A, B, C, D, E, F, G, H and I that correspond to 9 areas, and has electrode pads 100, 105, 110, 115, 120, 125, 130, 135, 140 corresponding to the plurality of areas formed therein. The first transparent electrode 20 and the second transparent electrode 30 are constituted with an electrode pad part for inputting voltage and a transparent electrode part for directly applying voltage to the electroactive polymer film 10, and have 9 areas each formed therein. The number and size of the transparent electrode pattern for applying voltage to each area can be variously configured according to the use or the structure of the laser display device. Accordingly, as the first transparent electrode 20 and the second transparent electrode 30 are divided into a plurality of areas, the shape of scattering pattern in each divided area of the electroactive polymer film 10 becomes different when a different voltage is applied for each area.

Figure 5:
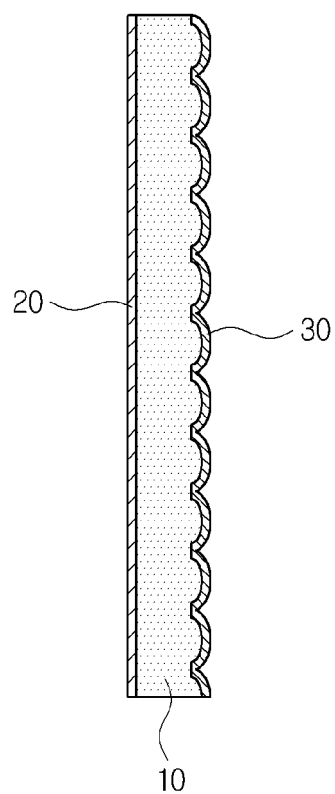
FIG. 5 shows the active diffuser having a micro lens pattern in accordance with an embodiment of the present invention.

FIG. 5 shows the active diffuser having a micro lens pattern in accordance with an embodiment of the present invention. The first transparent electrode 20 and the second transparent electrode 30 for applying the voltage are coated on the electroactive polymer film 10 having a micro lens pattern. The size of a lens in the micro lens pattern can be between a few microns and a few hundred microns.

Moreover, the size of the lenses constituting the micro lens pattern can be different from one another. Accordingly, when the lenses are formed in different sizes, the phase change of the lenses is different from one another even if the same voltage is applied to the pattern having different lens sizes, and thus the shape of the scattering pattern becomes different according to the lens size. The active diffuser having a micro lens pattern can not only function as a diffuser but also focus or diffuse the light. That is, owing to the pattern of the lenses, the light can be focused or diffused. Moreover, by diversifying the lens pattern, the focal distance of each lens can be varied by supplying the voltage, and thus the speckle can be reduced by defocusing.

Hereinafter, a laser display device having the active diffuser in accordance with an embodiment of the present invention will be described in detail with reference to the accompanying drawings.

FIG. 6 illustrates a laser display device having the active diffuser in accordance with an embodiment of the present invention that includes a light input part 200, an active diffuser 300, a voltage applying part 400, and a light projecting part 500.

The light input part 200 includes a laser light source 205, a lens 210 for changing laser ray outputted from the laser light source 205 to a parallel ray, and a modulator 215 for modulating the intensity of the laser ray outputted from the lens 210. The laser light source 205, the lens 210 and the modulator 215 that carry out their respective functions of the light input part 200 are the same as a typical module commonly used in a conventional laser display device, and thus the technical characteristics thereof will not be described herein.

The active diffuser 300 functions to reduce the speckle of laser ray by spatially and temporally changing the phase of the laser ray incident from the light input part 200 when voltage is applied. The active diffuser 300 includes the electroactive polymer film 10 having at least one or more scattering patterns, the first transparent electrode 20 coated on one surface of the electroactive polymer film 10, and the second transparent electrode 30 coated on the other surface of the electroactive polymer film 10.

The shape of the scattering pattern of the electroactive polymer film 10 is varied by the voltage applied through the first transparent electrode 20 and the second transparent electrode 30. The electroactive polymer film 10 has a plurality of scattering patterns having multi-level phases formed therein, and each of the plurality of scattering patterns is varied when voltage is applied. Moreover, the scattering pattern of the electroactive polymer film 10 can be a micro lens pattern. The first transparent electrode 20 and the second transparent electrode 30 can each be divided into a plurality of areas and have electrode pads corresponding, respectively, to the plurality of divided areas. The details of the active diffuser 300 are the same as the description of FIGS. 1 to 5 and thus will not be described redundantly herein.

The voltage applying part 400 is connected with the first transparent electrode 20 and the second transparent electrode 30 of the active diffuser 300 and applies voltage to the active diffuser 300. The voltage applying part 400 applies voltage repeatedly to the active diffuser 300 at regular intervals. When the voltage applying part 400 applies the voltage repeatedly at regular intervals, the active diffuser 300 changes the scattering pattern periodically according to the phase change caused by the applying of the voltage, decreasing the coherence of the laser ray and reducing the speckle generated in the laser display device.

While it is possible for the voltage applying part 400 to apply a same voltage to the active diffuser 300, it is also possible that different voltages are applied to divided areas if the first transparent electrode 20 and the second transparent electrode 30 are divided into predetermined areas. For example, in the case where the first transparent electrode 20 and the second transparent electrode 30 are divided into 9 areas, as shown in FIG. 4, the voltage applying part 400 applies different voltages to the electrode pads of the divided areas, respectively. Accordingly, when different voltages are applied to the divided areas of the first transparent electrode 20 and the second transparent electrode 30, the shape of scattering pattern in the plurality of divided areas of the electroactive polymer film 10 is different from one another.

The light projecting part 500 includes a condensing lens 505 for concentrating the laser ray outputted through the active diffuser 300 and a scanner 510 for projecting the laser ray outputted through the condensing lens 505 to a screen. The condensing lens 505 and the scanner 510 that carry out their respective functions of the light projecting part 500 are the same as a typical module commonly used in a conventional laser display device, and thus the technical characteristics thereof will not be described herein.

Although certain embodiments of the present invention have been described, it shall be appreciated that there can be a very large number of permutations and modification of the present invention by those who are ordinarily skilled in the art to which the present invention pertains without departing from the technical ideas and boundaries of the present invention, which shall be defined by the claims appended below. Accordingly, the technical ideas of the present invention shall not be limited by the embodiments and the drawings disclosed herein.

It shall be also appreciated that many other embodiments other than the embodiments described above are included in the claims of the present invention.

What is claimed is:

1. An active diffuser for reducing speckles, comprising:
   an electroactive polymer film having a plurality of scattering patterns;
   a first transparent electrode coated on one surface of the electroactive polymer film; and
   a second transparent electrode coated on the other surface of the electroactive polymer film,
   wherein the shape of each of the scattering patterns of the electroactive polymer film is varied by voltage applied through the first transparent electrode and the second transparent electrode,
   wherein the scattering patterns of the electroactive polymer film are micro lens patterns, each micro lens pattern having a focal length that varies according to the applied voltage, and
   wherein the micro lens patterns include lens patterns having sizes different from one another, and the differently-sized lens patterns have phases different from one another.

2. The active diffuser of claim 1, wherein the shape of each of the scattering patterns is varied whenever the voltage is repeatedly applied to the electroactive polymer film at regular intervals.

3. The active diffuser of claim 1, wherein the micro lens patterns diffuse laser rays.

4. The active diffuser of claim 1, wherein the first transparent electrode and the second transparent electrode are made of at least one material selected from the group of materials consisting of ITO (indium tin oxide), carbon nanotube, chalcogenide, graphene, and silver nanowire.

5. The active diffuser of claim 1, wherein the first transparent electrode is divided into a plurality of electrodes, further comprising a plurality of electrode pads separately formed on each of the divided electrodes of the first and second transparent electrodes.

6. The active diffuser of claim 1, wherein the electroactive polymer film has a plurality of scattering patterns having multi-level phases formed therein, each of the plurality of scattering patterns having a shape that is varied when the voltage is applied.

7. A laser display device having an active diffuser, the laser display device comprising:
   a light input part comprising:
      a laser light source;
      a lens configured to change laser rays outputted from the laser light source to parallel rays; and
      a modulator configured to modulate an intensity of the laser rays outputted from the lens;
   an active diffuser configured to reduce speckles of the laser rays by spatially and temporally changing a phase of the laser rays incident from the light input part according to voltage applied to the active diffuser;
   a voltage applying part connected with the active diffuser and configured to apply voltage to the active diffuser; and
   a light projecting part comprising:
      a condensing lens configured to concentrate the laser rays outputted through the active diffuser; and
      a scanner configured to project the laser rays outputted through the condensing lens to a screen,
   wherein the active diffuser comprises:
      an electroactive polymer film having a plurality of scattering patterns;
      a first transparent electrode coated on one surface of the electroactive polymer film; and
      a second transparent electrode coated on the other surface of the electroactive polymer film,
   wherein the shape of each of the scattering patterns of the electroactive polymer film is varied by applying the voltage to the active diffuser through the first transparent electrode and the second transparent electrode,
   wherein the scattering patterns of the electroactive polymer film are micro lens patterns, each micro lens pattern having a focal length that varies according to the applied voltage, and
   wherein the micro lens patterns include lens patterns having sizes different from one another, and the differently-sized lens patterns have phases different from one another.

8. The laser display device of claim 7, wherein
   the first transparent electrode is divided into a plurality of electrodes,
   further comprising a plurality of electrode pads separately formed on each of the divided electrodes of the first and second transparent electrodes.

9. The laser display device of claim 7, wherein the voltage applying part applies the voltage repeatedly to the active diffuser at regular intervals.

10. The laser display device of claim 7, wherein the electroactive polymer film has a plurality of scattering patterns having multi-level phases formed therein, each of the plurality of scattering patterns having a shape that is varied when the voltage is applied.

11. A laser display device, comprising:
   a laser light source;
   a screen;
   a light modulator disposed in an optical path between the light source and the screen; and
   an active diffuser that is also disposed in the optical path between the light source and the screen, the active diffuser including
      an electroactive polymer film having a plurality of scattering patterns;
      a first transparent electrode coated on one surface of the electroactive polymer film; and
      a second transparent electrode coated on the other surface of the electroactive polymer film,
   wherein the shape of each of the scattering patterns of the electroactive polymer film is varied by voltage applied through the first transparent electrode and the second transparent electrode,
   wherein the scattering patterns of the electroactive polymer film are micro lens patterns, each micro lens pattern having a focal length that varies according to the applied voltage, and
   wherein the micro lens patterns include lens patterns having sizes different from one another, and the differently-sized lens patterns have phases different from one another.

* * * * *